July 19, 1949.    P. F. HUMIG    2,476,664
SPRING SUSPENSION SYSTEM AND UNIT FOR VEHICLES
Filed May 23, 1947    3 Sheets-Sheet 1
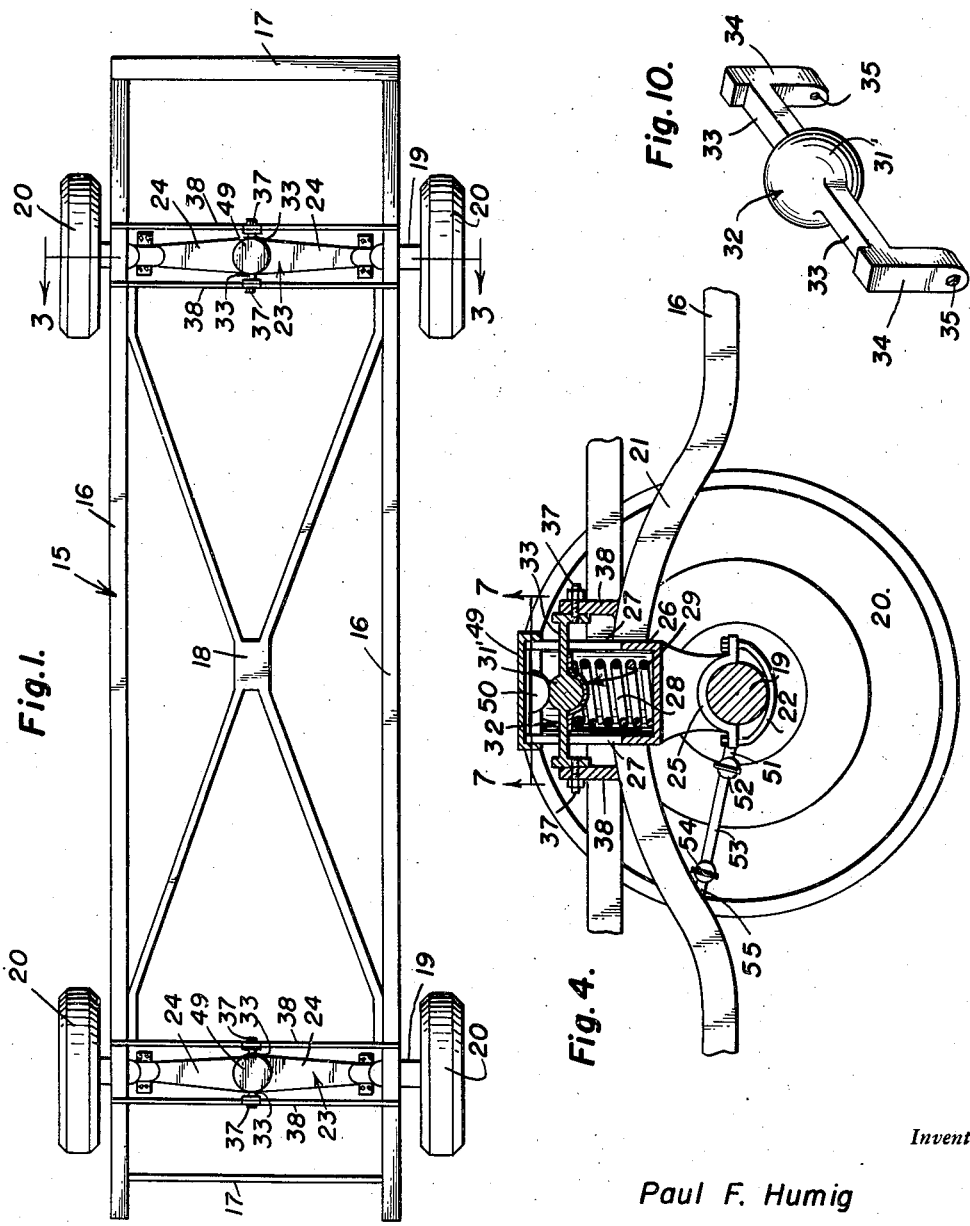
Inventor
Paul F. Humig
By Clarence A. O'Brien
and Harvey B. Jacobson
Attorneys July 19, 1949.  P. F. HUMIG  2,476,664
SPRING SUSPENSION SYSTEM AND UNIT FOR VEHICLES
Filed May 23, 1947  3 Sheets-Sheet 2
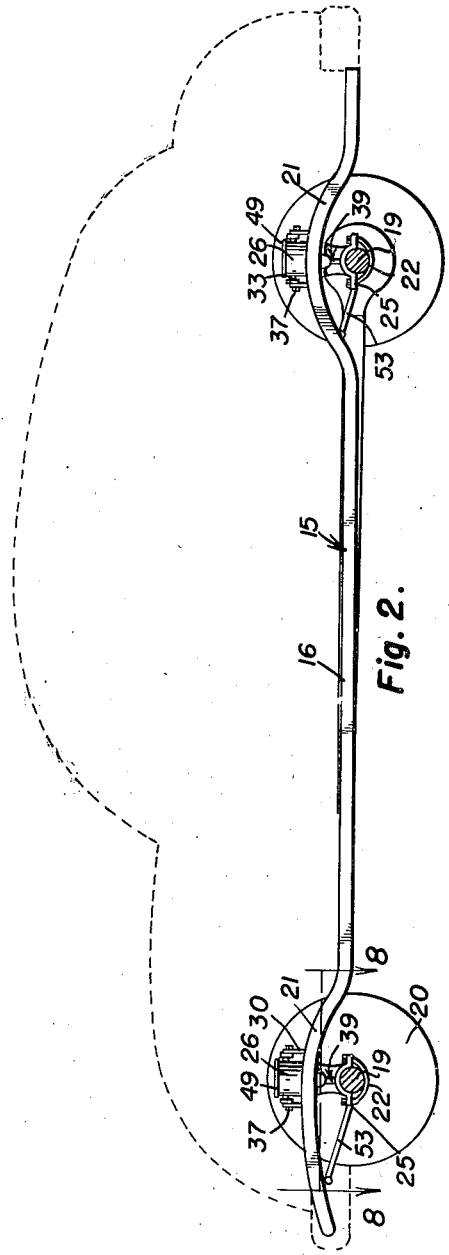
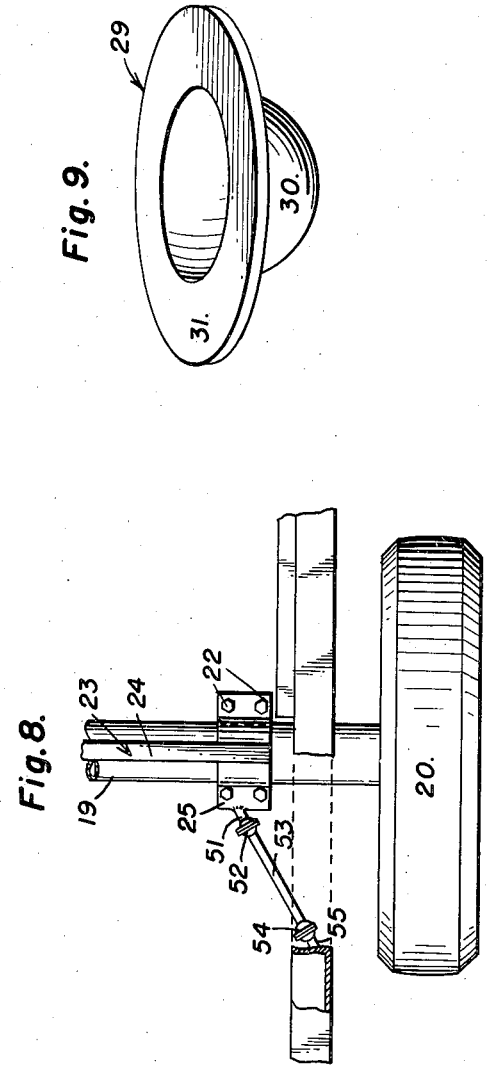
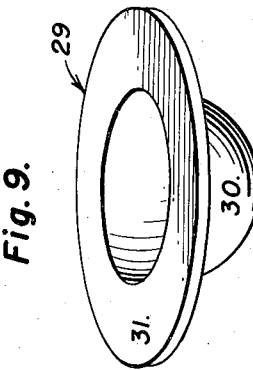
Inventor
Paul F. Humig

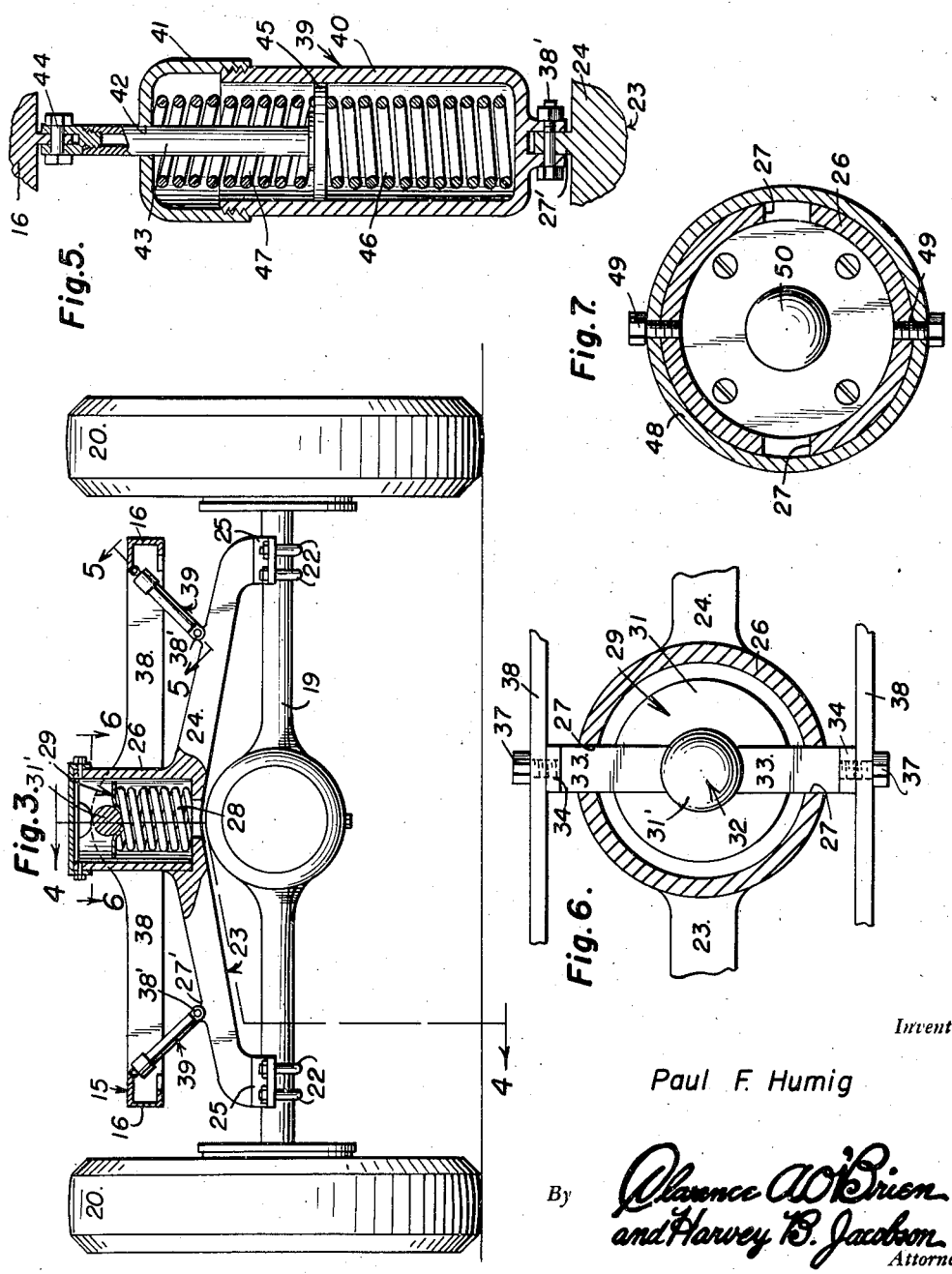

Patented July 19, 1949

2,476,664

UNITED STATES PATENT OFFICE 2,476,664

SPRING SUSPENSION SYSTEM AND UNIT
FOR VEHICLES

Paul F. Humig, Honolulu, Territory of Hawaii

Application May 23, 1947, Serial No. 749,996

7 Claims. (Cl. 280—108.5)

This invention relates to a spring suspension system and unit for vehicles and has for its primary object to improve the riding qualities of passenger vehicles, particularly of the self-propelled type.

Another object is to eliminate swaying and skidding on turns, and to distribute the weight of the body and load of the vehicle evenly on all four wheels thereof.

Still other objects include improving the stability and riding comfort of the vehicle.

The above and other objects may be attained by employing this invention which embodies among its features an arch-shaped yoke connected at opposite ends to the axle of a vehicle, a spring receiving socket extending upwardly from the yoke midway between opposite ends thereof, a compression spring seated in the socket, a suspension bracket supported on the upper end of the spring and lying along an axis which lies perpendicular to the axis of the yoke, and means coupling opposite ends of the bracket to the chassis of the vehicle.

Other features include stabilizers, each connected at one end to a yoke between its junction with the axle and the socket thereof and at its opposite end to the chassis between a pair of cross members.

Still other features include links each connected at one end to one end of a yoke and at its opposite end to the chassis in advance of the yoke, to hold the yoke perpendicular to the surface being traversed.

In the drawings:

Figure 1 is a plan view of a chassis and the axles of a self-propelled vehicle illustrating this improved spring suspension connected therewith.

Figure 2 is a side view of Figure 1 illustrating the wheels on the near side removed, and the axles in section, Figure 3 is a transverse sectional view taken substantially along the line 3—3 of Figure 1 on a somewhat enlarged scale, Figure 4 is a vertical sectional view taken substantially along the line 4—4 of Figure 3, Figure 5 is a longitudinal sectional view through one of the stabilizers, Figure 6 is a horizontal sectional view taken substantially along the line 6—6 of Figure 3 on a somewhat enlarged scale, Figure 7 is a horizontal sectional view taken substantially along the line 7—7 of Figure 4 and being on a somewhat enlarged scale, Figure 8 is a fragmentary horizontal sectional view on an enlarged scale taken substantially along the line 8—8 of Figure 2, Figure 9 is a perspective view of the saddle member, and Figure 10 is a perspective view of the suspension bracket.

Referring to the drawings in detail the vehicle chassis designated generally 15 comprises side rails 16 of conventional form connected at opposite ends by conventional cross members 17 and braced by conventional brace members 18. This chassis 15 is adapted to be connected to the axles 19 equipped in a conventional manner with wheels 20 at opposite ends. As illustrated in Figure 2, the side rails 16 are arched as at 21 over each axle 19 in order to afford clearance and permit of vertical movement of the axle relative to the chassis.

Clamped as by U-bolts 22 which encircle each axle adjacent the wheels 20 thereon is a yoke designated generally 23 which comprises an arched body member 24 formed at each end with saddle members 25 which cooperate with the bolts 22 in securing the yoke 23 in proper position on its respective axle. Formed on each yoke and extending upwardly therefrom midway between opposite ends thereof is a tubular extension 26 forming a spring socket, and opening outwardly through the upper end of the tubular member 26 at diametrically opposite points are elongated slots 27, the axes of which lie perpendicular to the longitudinal axis of the yoke 23, and hence perpendicular to the axles. Formed on each arm of the yoke 23 between the socket 26 and the end of the arm is an upwardly extending ear 27' the purpose of which will be more fully hereinafter explained.

Seated on the bottom end of the socket 26 is a compression coil spring 28, and seated on the upper end of the compression coil spring is a saddle member designated generally 29 which as best illustrated in Figure 9 comprises a hollow hemi-spherical body 30 provided with an outstanding annular flange 31 which as illustrated in Figure 3 rests on the upper end of the spring while the hemi-spherical body 30 extends down into the spring and forms a guide by which the saddle member 29 is located in proper position to the spring.

Seated in the hemi-spherical cup 30 formed in the saddle member 29 for universal movement is the spherical body 31' of a suspension bracket 32. This suspension bracket comprises the spherical body 31' and a pair of diametrically opposed arms 33 which extend outwardly from opposite sides of the body 31' in axial alignment with one another. Formed at the outer end of each arm 33 is a depending leg 34 provided adjacent its lower end with an aperture 35, and each arm 33 is of a width readily to fit within a slot 27 in the tubular body 26. It will thus be seen that the suspension bracket 32 will be free to move along a vertical axis under the influence of the spring 28.

Suspended as by pivot bolts 37 which are secured in the openings 35 are spaced parallel cross members 38 which extend transversely of the chassis 15, and are welded or otherwise rigidly secured at opposite ends to the side rails of the chassis. These cross members 38 afford the coupling means between the spring suspension and the chassis as will be readily understood upon reference to the drawings and lie in spaced parallel relation to and on opposite sides of the longitudinal axis of each axle.

Pivotally connected to each ear 27' as at 38' is one end of a stabilizer designated generally 39, each of which comprises a cylinder 40 provided at one end with spaced ears which are adapted to straddle the ear 27' and are pierced to receive the pivot bolt 38'. The opposite end of the cylinder 40 is provided with external screwthreads to which a cap 41 is threaded. This cap is provided with an axial bore 42 for the reception of a plunger rod 43, the outer end of which is pivoted as at 44 to a side rail 16 between a pair of cross members 38.

The end of the plunger rod 43 opposite that coupled to the side rail 16 enters the cylinder 40 and carries a disk 45 which is of a diameter readily to slide within the cylinder 40. A compression coil spring 46 is housed within the cylinder and bears at one end against the closed end of the cylinder and at its opposite end against the disk 45 in order to yieldingly urge the disk in one direction. A second coil spring 47 encircles the plunger rod 43 and one end thereof bears against the inner side of the cap 41 while its opposite end bears on the face of the disk 45 opposite that engaged by the spring 46. It will thus be seen that the disk 45 will be yieldingly supported on the springs 46 and 47 between opposite ends of the stabilizer 39. With the stabilizers 39 coupled between the yokes 23 and the side rails 16 of the chassis 15 it will be obvious that while a certain amount of rocking motion may be permitted between the chassis of the yoke, the stabilizers will tend to hold the parts in proper riding position.

Closing the upper end of the tubular member or spring socket 46 of each yoke is a cap 48, held in proper position thereon by cap screws 49, and supported on the underside of the cap in axial alignment with the spherical body 31 and the spring 28 is a buffer 50 formed of a yielding material such as rubber.

Extending angularly from each saddle member 25 is an arm 51 coupled through a conventional universal coupling 52 to a link 53 which, in turn, is coupled through a conventional universal coupling 54 to an angularly extending arm 55 which is welded or otherwise rigidly fixed to a side rail 16 of the chassis at a point remote from the saddle 25 to which the opposite end of the link 53 is connected. It will thus be seen that while the yokes 23 may move vertically with relation to the chassis, movement of the yokes and consequently the axles longitudinally of the chassis will be prevented.

In use it will be understood that a load suspended on the chassis of the vehicle will be transmitted through the cross members 38 and suspension brackets 32 to the spring 28 of each yoke 23 and, in turn, transmitted by the yoke to the respective axle. Rocking of the chassis 15 along the longitudinal axis thereof will be resisted by the stabilizers 39 and at the same time road shocks experienced by the wheels 20 and the axles 19 will be absorbed in the springs 28, 46 and 47. By reason of the fact that the point of suspension of the chassis is above the general level thereof it will be obvious that the center of gravity of the vehicle and the load thereon will be below the point of suspension and thus lend stability to a vehicle. By reason of the coupling of the yokes adjacent their lower ends to opposite side rails of the chassis at a point remote from the longitudinal axis of the respective yoke it will be obvious that the axles and wheels will be held against longitudinal movement relative to the axis and at the same time the spring suspension will be free to function and permit the wheels and axles to move vertically with relation to the chassis.

While in the foregoing there has been shown and described the preferred embodiment of this invention it is to be understood that minor changes in the details of construction, combination and arrangement of parts may be resorted to without departing from the spirit and scope of the invention as claimed.

Having described my invention, what I claim as new is:

1. A spring suspension unit for a wheeled vehicle having a chassis and an axle which lies along an axis extending transversely of the chassis; said suspension unit comprising an arch shaped yoke connected at opposite ends to the axle, a spring receiving socket extending upwardly from the yoke midway between opposite ends thereof, a compression spring seated in the socket, a suspension bracket slidably carried by the socket and supported on the upper end of the spring and lying along an axis which lies perpendicular to the axis of the axle, means for guiding the sliding movement of said suspension bracket, and means coupling opposite ends of the bracket to the chassis.

2. A spring suspension unit for a wheeled vehicle having a chassis and an axle which lies along an axis extending transversely of the chassis; said suspension unit comprising an arch shaped yoke connected at opposite ends to the axle, a spring receiving socket extending upwardly from the yoke midway between opposite ends thereof, a compression spring seated in the socket, a suspension bracket slidably carried by said socket and supported on the upper end of the spring and lying along an axis which lies perpendicular to the axis of the axle, a pair of cross members fixed to the chassis and lying along opposite sides of the socket in parallel relation to the longitudinal axis of the yoke means guiding the sliding movement of said suspension bracket and holding the same against rotary movement, and means coupling the cross members to opposite ends of the suspension bracket.

3. A spring suspension unit for a wheeled vehicle having a chassis and an axle which lies along an axis extending transversely of the chassis; said suspension unit comprising an arch shaped yoke connected at opposite ends to the axle, a spring receiving socket extending upwardly from the yoke midway between opposite ends thereof, a compression spring seated in the socket, a suspension bracket supported on the upper end of the spring and lying along an axis which lies perpendicular to the axis of the axle, a pair of cross members fixed to the chassis and lying along opposite sides of the socket in parallel relation to the longitudinal axis of the yoke, said suspension bracket including a pair of diametrically opposed outwardly projecting arms, guide slots provided in said socket slidably engaging said arms, means coupling the cross members to opposite ends of the suspension bracket, and stabilizers each connected at one end to the yoke between the socket and an end thereof and at its opposite end to the chassis between the cross members.

4. A spring suspension unit for a wheeled vehicle having a chassis and an axle which lies along an axis extending transversely of the chassis; said suspension unit comprising an arch shaped yoke connected at opposite ends to the axle, a spring receiving socket extending upwardly from the yoke midway between opposite ends thereof, a compression spring seated in the socket, a suspension bracket supported on the upper end of the spring and lying along an axis which lies perpendicular to the axis of the axle, a pair of cross members fixed to the chassis and lying along opposite sides of the socket in parallel relation to the longitudinal axis of the yoke, said suspension bracket having outwardly projecting arms, guide slots provided in said socket slidably engaging said arms to hold the same against rotary movement, links each connected at one end to one end of the yoke and at its opposite end to the chassis at a point remote from the yoke, means securing said arms to said cross members, and stabilizers between said cross members and said yoke.

5. A spring suspension unit for a wheeled vehicle having a chassis and an axle which lies along an axis extending transversely of the chassis comprising an arch shaped yoke connected at opposite ends to the axle, a spring receiving socket extending upwardly from the yoke midway between opposite ends thereof, said socket having a pair of diametrically opposed slots through the wall thereof the axes of which lie in a plane which lies perpendicular to the longitudinal axis of the yoke, a compression coil spring seated in the socket, a saddle having a spherical concavity in its upper surface seated on the upper end of the coil spring, a suspension bracket having a spherical body seated in the concavity of the saddle and arms extending through the slots in the socket, spaced parallel cross members fixed to the chassis and extending transversely thereof on opposite sides of the socket and means coupling the ends of the arms to the cross members midway between their ends.

6. A spring suspension unit for a wheeled vehicle having a chassis and an axle which lies along an axis extending transversely of the chassis comprising an arch shaped yoke connected at opposite ends to the axle, a spring receiving socket extending upwardly from the yoke midway between opposite ends thereof, said socket having a pair of diametrically opposed slots through the wall thereof the axes of which lie in a plane which lies perpendicular to the longitudinal axis of the yoke, a compression coil spring seated in the socket, a saddle having a spherical concavity in its upper surface seated on the upper end of the coil spring, a suspension bracket having a spherical body seated in the concavity of the saddle and arms extending through the slots in the socket, spaced parallel cross members fixed to the chassis and extending transversely thereof on opposite sides of the socket, means coupling the ends of the arms to the cross members midway between their ends, and stabilizers each connected at one end to the yoke near one end thereof and at its opposite end to the chassis between the cross members.

7. A spring suspension unit for a wheeled vehicle having a chassis and an axle which lies along an axis extending transversely of the chassis comprising an arch shaped yoke connected at opposite ends to the axle, a spring receiving socket extending upwardly from the yoke midway between opposite ends thereof, said socket having a pair of diametrically opposed slots through the wall thereof the axes of which lie in a plane which lies perpendicular to the longitudinal axis of the yoke, a compression coil spring seated in the socket, a saddle having a spherical concavity in its upper surface seated on the upper end of the coil spring, a suspension bracket having a spherical body seated in the concavity of the saddle and arms extending through the slots in the socket, spaced parallel cross members fixed to the chassis and extending transversely thereof on opposite sides of the socket, means coupling the ends of the arms to the cross members midway between their ends, and links each connected at one end to the yoke and at its opposite end to the chassis at a point remote from the yoke.

PAUL F. HUMIG.

REFERENCES CITED

The following references are of record in the file of this patent:

UNITED STATES PATENTS

| Number | Name | Date |
|---|---|---|
| 1,153,602 | Chapin | Sept. 14, 1915 |
| 1,425,687 | Penton | Aug. 15, 1922 |
| 2,124,088 | Stout | July 19, 1938 |

FOREIGN PATENTS

| Number | Country | Date |
|---|---|---|
| 748,363 | France | Apr. 10, 1933 |